(12) United States Patent
Li et al.

(10) Patent No.: US 10,166,505 B2
(45) Date of Patent: Jan. 1, 2019

(54) METHOD OF TREATING GAS AND GAS TREATMENT DEVICE

(71) Applicant: Ching-Jing Photonergy Co., Ltd, Taoyuan (TW)

(72) Inventors: Ta-Ching Li, Taoyuan (TW); Tsui-Min Chen, Taoyuan (TW)

(73) Assignee: CHING-JING PHOTONERGY CO., LTD, Taoyuan (TW)

( * ) Notice: Subject to any disclaimer, the term of this patent is extended or adjusted under 35 U.S.C. 154(b) by 0 days.

(21) Appl. No.: 15/590,723

(22) Filed: May 9, 2017

(65) Prior Publication Data

US 2017/0326496 A1 Nov. 16, 2017

(30) Foreign Application Priority Data

May 13, 2016 (TW) ................. 105114815

(51) Int. Cl.
| | |
|---|---|
| *B01D 53/00* | (2006.01) |
| *B01D 53/14* | (2006.01) |
| *B01D 53/34* | (2006.01) |
| *B01D 53/50* | (2006.01) |
| *B01L 5/02* | (2006.01) |
| *B01L 7/00* | (2006.01) |
| *B01D 53/32* | (2006.01) |
| *B01D 53/56* | (2006.01) |

(52) U.S. Cl.
CPC ....... *B01D 53/1493* (2013.01); *B01D 53/007* (2013.01); *B01D 53/32* (2013.01); *B01D 53/56* (2013.01); *B01D 2251/104* (2013.01); *B01D 2252/103* (2013.01); *B01D 2257/402* (2013.01); *B01D 2258/0216* (2013.01); *B01D 2258/0283* (2013.01); *B01D 2259/804* (2013.01)

(58) Field of Classification Search
CPC ........ B01D 53/56; B01D 53/74; B01D 53/75; B01D 53/76; B01D 53/90; B01D 2251/102; B01D 2251/104; B01D 2257/402; B01D 2257/404; B01D 2259/804; B01D 2259/818; B01D 53/007; B01D 51/00; B01D 51/10
See application file for complete search history.

(56) References Cited

U.S. PATENT DOCUMENTS

| | | | | |
|---|---|---|---|---|
| 4,146,450 A | * | 3/1979 | Araki | B01D 53/8625 204/157.3 |
| 4,416,748 A | * | 11/1983 | Stevens | B01D 53/007 204/157.3 |
| 7,156,957 B1 | * | 1/2007 | Parrish | B01D 53/56 204/157.3 |
| 2003/0015413 A1 | * | 1/2003 | Rising | B01D 53/56 204/157.3 |
| 2010/0239480 A1 | * | 9/2010 | Jurng | B01D 53/261 423/239.1 |

\* cited by examiner

*Primary Examiner* — Timothy C Vanoy
(74) *Attorney, Agent, or Firm* — Ming Chow; Sinorica, LLC

(57) ABSTRACT

Method of treating gas and gas treatment device, the gas treatment device comprising: a first chamber, comprising a first inlet, a first outlet and a first energy supply system, allowing the gas to enter the first chamber through the first inlet; a second chamber comprising a second outlet and a second energy supply system; a third chamber comprising a third inlet in communication with the first outlet and the second outlet; and a fourth chamber comprising a fourth inlet and a scrubbing system containing a solvent comprising water molecules ($H_2O$), wherein the third outlet of the third chamber is in communication with the fourth inlet of the fourth chamber.

29 Claims, 9 Drawing Sheets

METHOD OF TREATING GAS AND GAS TREATMENT DEVICE

BACKGROUND OF THE INVENTION

Field of the Invention

The present invention relates to methods of treating a gas and gas treatment devices and, more particularly, to a method of treating a gas and a gas treatment device with a view to purifying the gas by cracking the gas and ozone separately and then allowing the products to mix and react with each other.

Description of the Prior Art

Nitrous oxide ($N_2O$) accounts for destruction of the ozone layer, because $N_2O$ has an enormous ability to absorb vacuum ultraviolet (VUV) and decompose into nitrogen gas ($N_2$) and oxygen atoms (O). Then, the oxygen atoms (O) react with ozone ($O_3$) to produce oxygen gas ($O_2$), thereby depleting ozone ($O_3$). The aforesaid process is expressed by chemical equations as follows:

$$N_2O + h\nu \rightarrow N_2 + O$$

$$O + O_3 \rightarrow 2O_2$$

Semiconductor fabs, which often have strict requirements for greenhouse gas emissions and standards, endeavor to develop techniques of eliminating $N_2O$ end gas and reducing $NO_x$, for example, combustion, plasma cracking, and electrothermy. The techniques incur high costs in fuel, electricity, and electrode dissipation. Furthermore, semiconductor fabs usually use $N_2$ as the major gas for diluting various gases. However, combustion, plasma cracking, and electrothermy, which are carried out at high temperature, entail cracking $N_2$ into $NO_x$ again, thereby causing secondary pollution insidiously.

U.S. Pat. No. 5,206,002, U.S. Pat. No. 6,162,409, U.S. Pat. No. 6,649,132 and U.S. Pat. No. 7,303,735 disclose using ozone to treat $N_2O$ and $NO_x$ but require that oxidation should occur in the presence of ozone of a high concentration, i.e., 1.5 moles, to the detriment of applicability, because of cost-ineffectiveness.

China patent ZL03115442.5, Japan patent JP2000157621A, and Japan patent JP2001235201A disclose decomposing smelly gases, such as $NH_3$ and $H_2S$, with ultraviolet but prove disadvantageous and ineffective, because full-band ultraviolet lamps cannot endure an overly strong draft or an overly high concentration of smelly gas.

U.S. Pat. No. 7,837,966 discloses decomposing hydrocarbons by ultraviolet and ozone, designing modularization to reduce concentrations of hydrocarbons by a means of combination, and monitoring ozone concentration to reduce environmental pollution. According to U.S. Pat. No. 7,837,966, the purpose of UVC with a wavelength of 254 nm is to crack $O_3$ into oxygen atoms for reacting with hydrocarbons rather than crack hydrocarbons directly, wherein channels of a reaction chamber are designed to allow hydrocarbons to stay long enough to facilitate the reaction.

U.S. Pat. No. 7,272,925 discloses reducing $NO_x$ concentration with ultraviolet and ozone, wherein hydrocarbons are introduced so that the hydrocarbons, ozone and water vapor are irradiated with UV of a wavelength 254 nm to produce a catalyst, thereby eliminating $NO_x$ with the catalyst.

U.S. Pat. No. 6,506,351 discloses that ozone is heated to 50-150° C. and then reacts with $NO_x$ to produce $N_2O_5$ before removal thereof.

U.S. Pat. No. 7,498,009 discloses performing $NO_x$ treatment with UV and ammonia ($NH_3$) in the same chamber. However, $NH_3$ is a noxious gas. Therefore, the use of $NH_3$ is likely to cause secondary pollution. US20100108489 discloses that $N_2O$ gas in a UV chamber is cracked and repeatedly cycled to react with by-products so that NO gas is eventually produced; however, the production process takes at least tens of minutes and thus is inefficient, not to mention that the end product is still a nitrogen oxide.

None of the aforesaid patents discloses a solution pertaining to $N_2O$ (laughing gas). Although, broadly speaking, $NO_x$ comprises $N_2O$, $N_2O$ is so stable that it will not undergo cracking completely unless it is specially treated. Therefore, $N_2O$ is treated quite differently from NO and $NO_2$. In this regard, none of the aforesaid patents gives considerations to the depth of absorption of ultraviolet by a gas or a smelly gas, half-life of ozone, radical production timing and reaction sequence. In view of this, any mechanism for eliminating $N_2O$ must take into account the absorption of ultraviolet by $N_2O$, the effects of ozone on ultraviolet, the best timing of reactions between $N_2O$ and ozone, and how the reactions take place.

Therefore, it is important to provide an apparatus or method of treating a waste gas or $N_2O$-containing gas efficiently and cost-effectively.

DETAILED DESCRIPTION OF THE EMBODIMENT OF THE INVENTION

Figure 1:
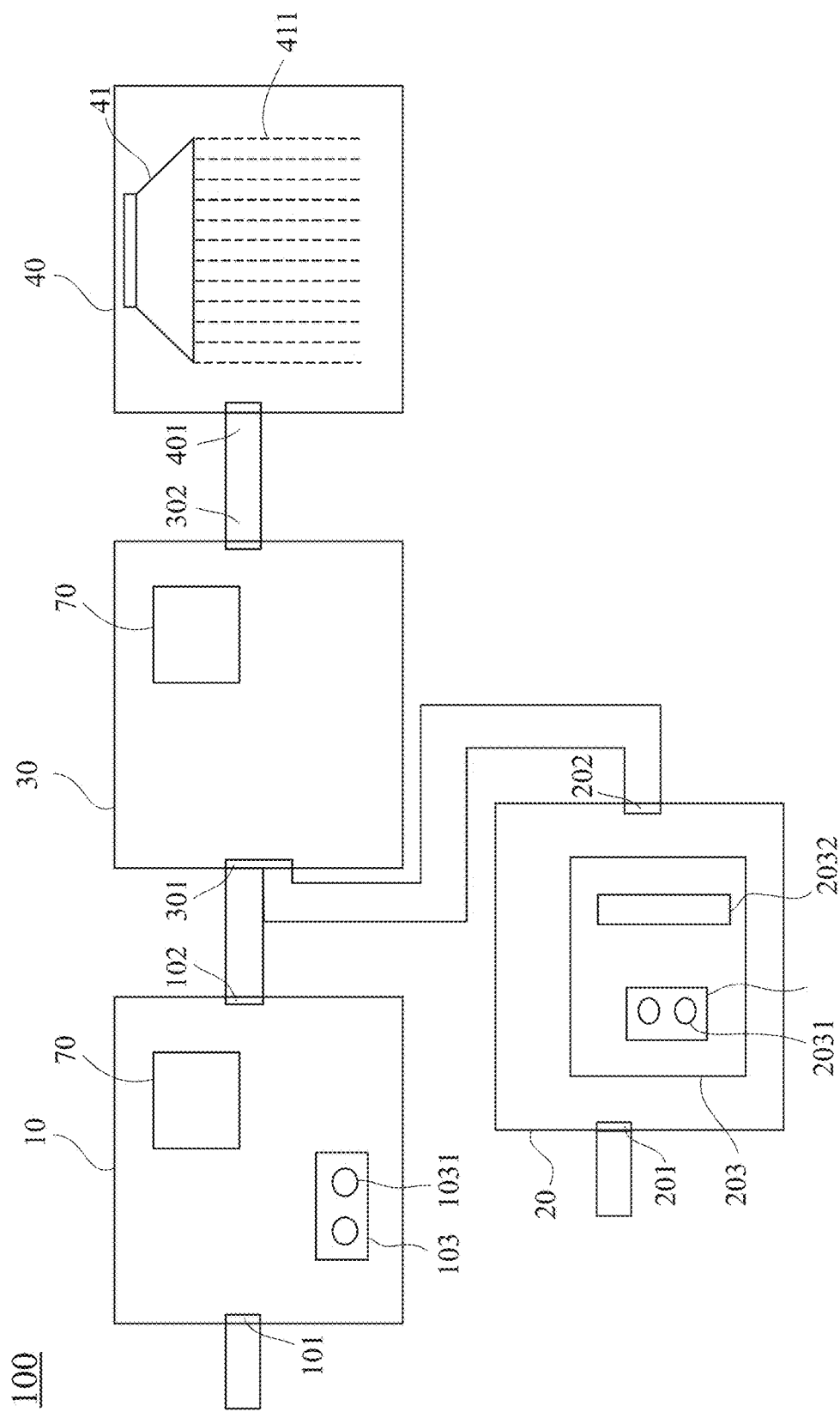
FIG. 1 is a schematic view of a gas treatment device according to the present invention.

The present invention discloses a gas treatment method and a gas treatment device, wherein related basic principles, such as redox reactions of an intended gas, are well-known among persons skilled in the art and thus are not fully described below. The accompanying drawings, which depict structures related to the technical features of the present invention, are not and need not drawn to scale.

The present invention provides a gas treatment device 100 for treating a gas comprising a nitrous oxide ($N_2O$). The gas treatment device 100 comprises a plurality of chambers in communication with each other, namely a first chamber 10, a second chamber 20, a third chamber 30 and a fourth chamber 40. Operation of the chambers is described below.

The first chamber 10 comprises a first inlet 101, a first outlet 102 and a first energy supply system 103. The gas, which comprises noxious gases, enters the first chamber 10 through the first inlet 101. The gas, such as sulfur oxides ($SO_x$), originates from emissions of fired power plants as a result of high-temperature combustion. Examples of an end gas produced by a semiconductor manufacturing process include methane ($CH_4$) and $N_2O$. The first energy supply system 103 disposed in the first chamber 10 comprises a heat energy, a light energy or a combination thereof. In a preferred embodiment, the first energy supply system 103 comprises a first ultraviolet source 1031 with a wavelength of 160-210 nm. Depending on the constituents of the gas to be treated, a specific heat energy or light energy is selectively provided; hence, an excited-state ionized gas can be produced from the gas in the first chamber 10.

The second chamber 20 comprises a second outlet 202 and a second energy supply system 203. An appropriate gas reactant for use with the gas delivered to the first chamber 10 and intended to be treated is placed in the second chamber 20. Therefore, the second chamber 20 comprises a second inlet 201 for replenishing the second chamber 20 with the gas reactant.

Depending on characteristics of the gas reactant, the second energy supply system 203 comprises an appropriate energy, such as a heat energy, a light energy or a combination thereof. In a preferred embodiment, the second energy supply system 203 comprises a heat-generating device 211 for generating a temperature of 100-300° C. Alternatively, the second energy supply system 203 further comprises a second ultraviolet source 2031 with a wavelength of 230-280 nm. Hence, the gas reactant in the second chamber 20 forms an excited-state gas reactant.

The third chamber 30 comprises a third inlet 301 and a third outlet 302. The fourth chamber 40 comprises a fourth inlet 401, a fourth outlet 402 and a scrubbing system 41.

The first outlet 102 of the first chamber 10 and the second outlet 202 of the second chamber 20 are in communication with the third inlet 301 of the third chamber 30. Hence, with the first chamber 10, the gas intended to be purified is treated first and solely. An excited-state ionized gas is produced in the first energy supply system 103 and then delivered to the third chamber 30. With the second energy supply system 203, an excited-state gas reactant is produced from the gas reactant in the second chamber 20 and then delivered to the third chamber 30. Therefore, after being delivered to the third chamber 30, the excited-state ionized gas reacts with the excited-state gas reactant fully.

The third outlet 302 of the third chamber 30 is in communication with the fourth inlet 401 of the fourth chamber 40 such that the resultant gas in the third chamber 30 can be delivered to the fourth chamber 40. The fourth chamber 40 comprises the scrubbing system 41. The scrubbing system 41 contains a solvent 411 which comprises water molecules ($H_2O$) and dissolves the gas in the fourth chamber 40.

With the first chamber 10 and the second chamber 20, the gas and the gas reactant intended to be treated are treated separately and solely and then delivered to the third chamber 30 to mix and react with each other. It is because a conventional waste gas consists of various intricate gases. If the gas reactant is directly introduced to react with the waste gas, a process of complicated and repeated cracking and combination will occur to the detriment of the reaction and the efficiency of purification. Regarding the gas treatment device 100 of the present invention, an excited-state ionized gas is produced from the gas to be treated and disposed in the first chamber 10, and then an excited-state gas reactant is produced from the gas reactant and disposed in the second chamber 20; afterward, the excited-state ionized gas and the excited-state gas reactant are delivered to the third chamber 30 to undergo a reaction, thereby enhancing the efficiency of the reaction.

In a preferred embodiment, a turbulence system 70 is disposed in the first chamber 10 or the third chamber 30 to enable the gas in the first chamber 10 to react with the first energy supply system 103 uniformly and efficiently and enable the excited-state ionized gas and the excited-state gas reactant in the third chamber 30 to react with each other uniformly and efficiently. Therefore, the turbulence system 70 has a turbulent flow for generating Reynolds number of at least 3000. The aforesaid preferred embodiment of the present invention is not restrictive of the design of the turbulence system 70. The turbulence system 70 of the present invention will work, provided that the turbulence system 70 brings a turbulence effect effectively inside the first chamber 10 and the third chamber 30, especially if the turbulence system 70 generates a turbulent flow.

Figure 2:
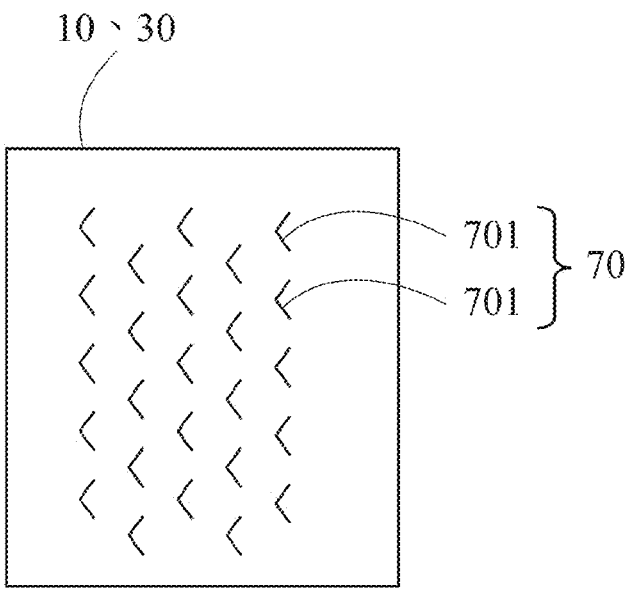
FIG. 2 through FIG. 4 are schematic views of a turbulence system according to the present invention.
Figure 3:
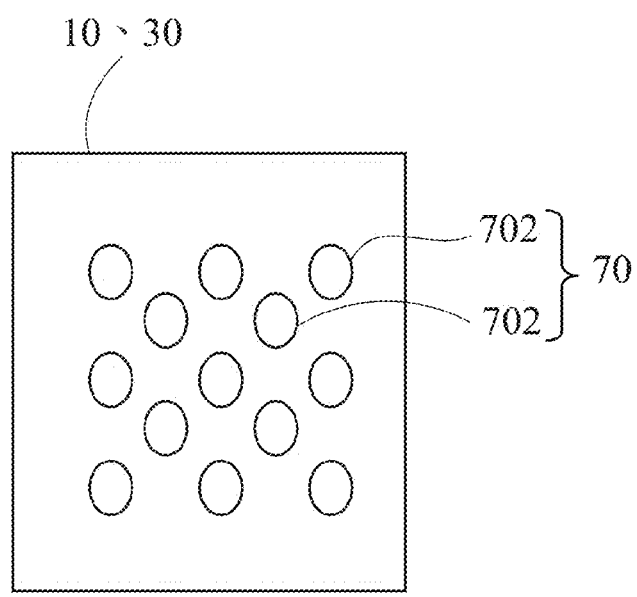
Figure 4:
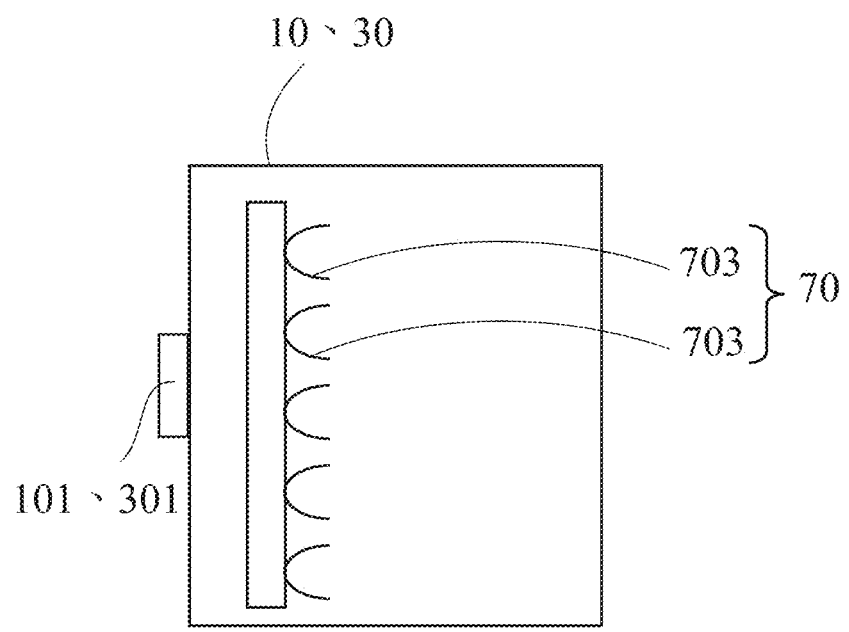

Referring to FIG. 2, the turbulence system 70 in the first chamber 10 or the third chamber 30 comprises a plurality of fins 701 distributed throughout gas channels of the first chamber 10 or the third chamber 30. Referring to FIG. 3, the turbulence system 70 comprises a plurality of ultraviolet sources 702 arranged in a matrix or alternately and disposed in the gas channels of the first chamber 10 or the third chamber 30 such that the gas flows and collides with the ultraviolet sources 702 to not only bring a turbulence effect but also increase effective gas reaction area of the ultraviolet sources 702. Referring to FIG. 4, alternatively, the turbulence system 70 comprises a plurality of nozzles 703. A gas current emitted from the nozzles 703 enables the gas to mix better and enhance reaction efficiency. Likewise, for the sake of cost-effectiveness, it is feasible to further enhance the efficiency of producing the excited-state gas reactant by disposing the turbulence system 70 in the second chamber 20, as required by the second energy supply system 203 and the gas reactant in the second chamber 20.

Figure 5:
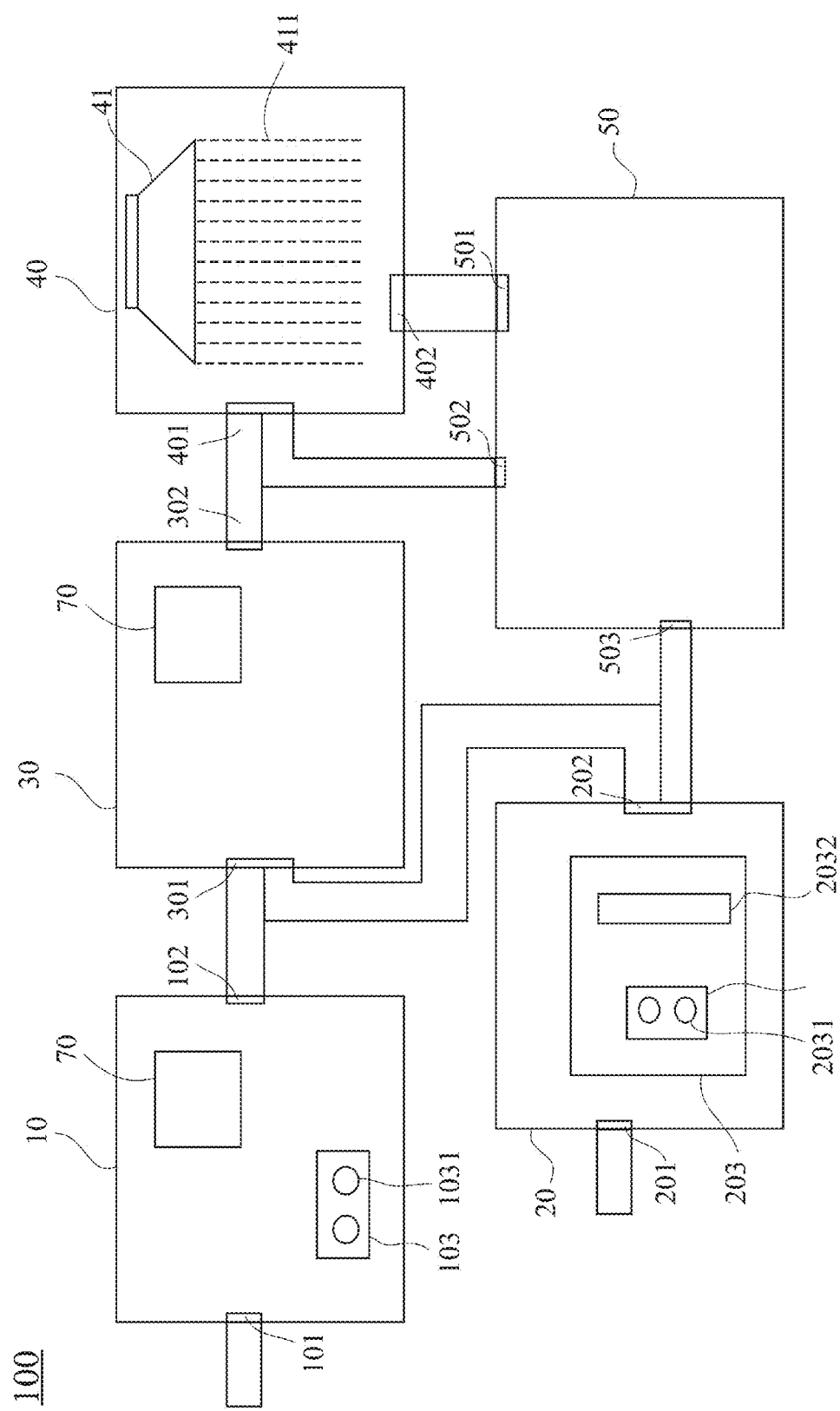
FIG. 5 is a schematic view of another gas treatment device according to the present invention.

Referring to FIG. 5, in another embodiment, the gas treatment device 100 further comprises a fifth chamber 50 which comprises a fifth inlet 501 and a fifth outlet 502. The fifth inlet 501 of the fifth chamber 50 is in communication with the fourth outlet 402 of the fourth chamber 40. Therefore, after being treated by the scrubbing system 41 of the fourth chamber 40, any gas which has not yet dissolved in the solvent 411 in the scrubbing system 41 can be delivered to the fifth chamber 50 through the fourth outlet 402. The fifth chamber 50 contains a gas reactant. The gas reactant in the fifth chamber 50 can be identical to that of the second chamber 20, but the present invention is not restricted thereto. Therefore, the fifth chamber 50 further has a fifth gas inlet 503 in communication with the second outlet 202 of the second chamber 20. The excited-state gas reactant is delivered to the fifth chamber 50 to react with any gas therein which has not yet dissolved in the solvent 411. Then, the resultant gas is delivered from the fifth chamber 50 to the fourth chamber 40 through the fifth outlet 502 and the fourth inlet 401 before being treated by the scrubbing system 41 repeatedly.

It is also feasible for the turbulence system 70 to be disposed in the fifth chamber 50 so that the excited-state gas reactant is more likely to react fully with any undissolved gas which originates from the fourth chamber 40 and is present in the fifth chamber 50.

Figure 6:
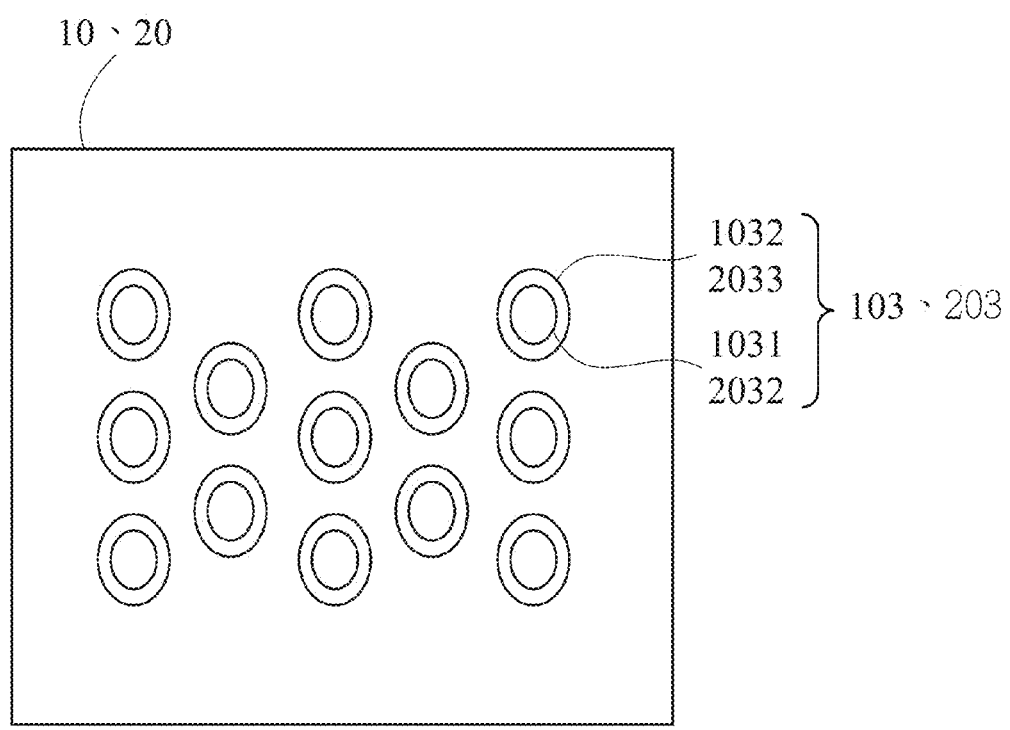
FIG. 6 is a schematic view of a first chamber and a second chamber according to the present invention.

Referring to FIG. 6, in this embodiment, the first energy supply system 103 has therein at least one first hermetically sealed container 1032. The material which the at least one first hermetically sealed container 1032 is made of depends on the source of the first energy supply system 103. For example, if the source of the first energy supply system 103 is a heat energy, the at least one first hermetically sealed container 1032 can be made of a material of a satisfactory heat transfer coefficient. If the source of the first energy supply system 103 originates from the first ultraviolet source 1031 of this embodiment, the wall of the at least one first hermetically sealed container 1032 will be made of high-purity quartz, sapphire or a material penetrable by the source. In this embodiment, the first ultraviolet source 1031 is disposed in the at least one first hermetically sealed container 1032 such that the effective reaction area of irradiation of the first ultraviolet source 1031 increases. In this embodiment, the wall of the at least one first hermetically sealed container 1032 is made of a material penetrable by the ultraviolet source with a wavelength of 160-210 nm, so as to ensure the penetration efficiency of the first ultraviolet source 1031.

Likewise, the second energy supply system 203 has therein at least one second hermetically sealed container 2033. The material which the at least one second hermetically sealed container 2033 is made of depends on the source of the second energy supply system 203. For example, if the source of the second energy supply system 203 is a heat energy, the at least one second hermetically sealed container 2033 can be made of a material of a satisfactory heat transfer coefficient. If the source of the second energy supply system 203 originates from a second ultraviolet source 2032 of this embodiment, the wall of the at least one second hermetically sealed container 2033 will be made of high-purity quartz, sapphire or a material penetrable by the source. In this embodiment, the second ultraviolet source 2032 is disposed in the at least one second hermetically sealed container 2033 such that the effective reaction area of irradiation of the second ultraviolet source 2032 increases. In this embodiment, the wall of the at least one second hermetically sealed container 2033 is made of a material penetrable by the ultraviolet source with a wavelength of 230-280 nm, so as to ensure the penetration efficiency of the second ultraviolet source 2032.

Figure 7:
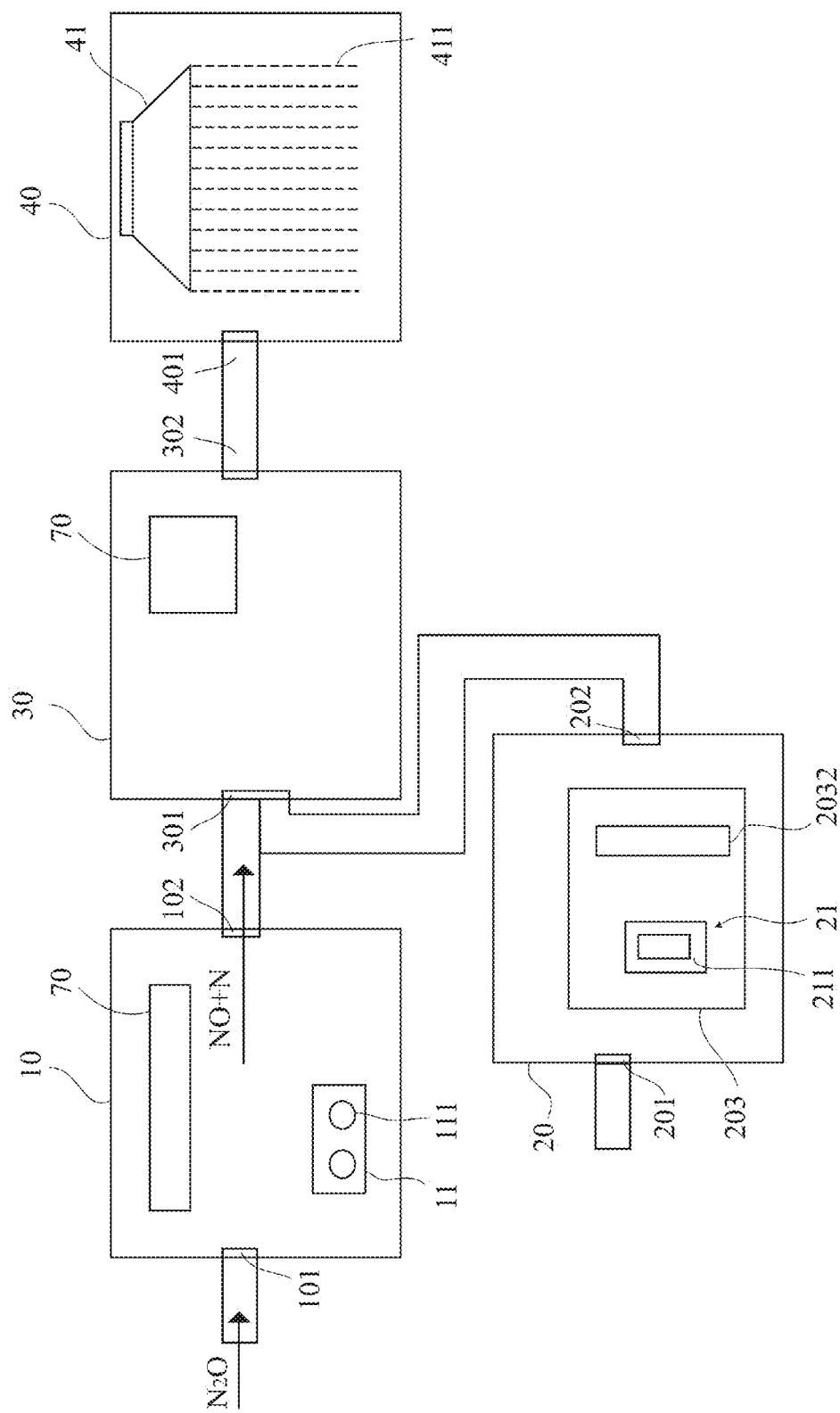
FIG. 7 through FIG. 8 and FIG. 10 are schematic views of a method of treating a gas according to the present invention.

Referring to FIG. 7, the present invention further provides a method of treating a gas which comprises a nitrous oxide ($N_2O$). The method of treating a gas comprises the steps of: delivering the gas to the first chamber 10; and supplying a first energy 11 to the first chamber 10 to enable the gas to form an excited-state ionized gas, wherein the ionized gas comprises a nitric oxide (NO) and a nitrogen atom (N). The first energy 11 is supplied by the first energy supply system 103 so as to supply an appropriate energy to the first chamber 10, cause the gas to undergo cracking, and enable the gas to form an excited-state ionized gas, including nitric oxide (NO) and a nitrogen atom (N). Therefore, the first energy 11 is provided in the form of a mixture of heat energy and light energy or in the form of either heat energy or light energy. In this embodiment, a first ultraviolet source 111 with a wavelength of 160-210 nm is provided such that the ultraviolet at this wavelength cracks nitrous oxide ($N_2O$) of the gas into NO and N, as expressed by reaction equation (1) below.

$$N_2O + h\nu \rightarrow NO + N(^4S) \qquad (1)$$

An ozone ($O_3$) is delivered to the second chamber 20. The second chamber 20 contains a second energy 21. The second energy 21 enables the ozone to produce an excited-state oxygen atom (O). The second energy 21 is supplied by the second energy supply system 203 and adapted to appropriately supply an appropriate energy to the second chamber 20, thereby further promoting the cracking of the ozone. Therefore, the second energy 21 is provided in the form of a mixture of a heat energy and a light energy or in the form of either a heat energy or a light energy. In this embodiment, the second energy 21 is supplied by a heat-generating device 211, whereas the heat-generating device 211 can be directly disposed inside or outside the second chamber 20, provided that the second chamber 20 stays at 100-300° C.; hence, the ozone is quickly cracked into $O_2$ and O, and the oxygen atom is promoted to an excited state, as expressed by reaction equation (2) below.

$$O_3 + energy \rightarrow O(^1D) + O_2 \qquad (2)$$

Figure 8:
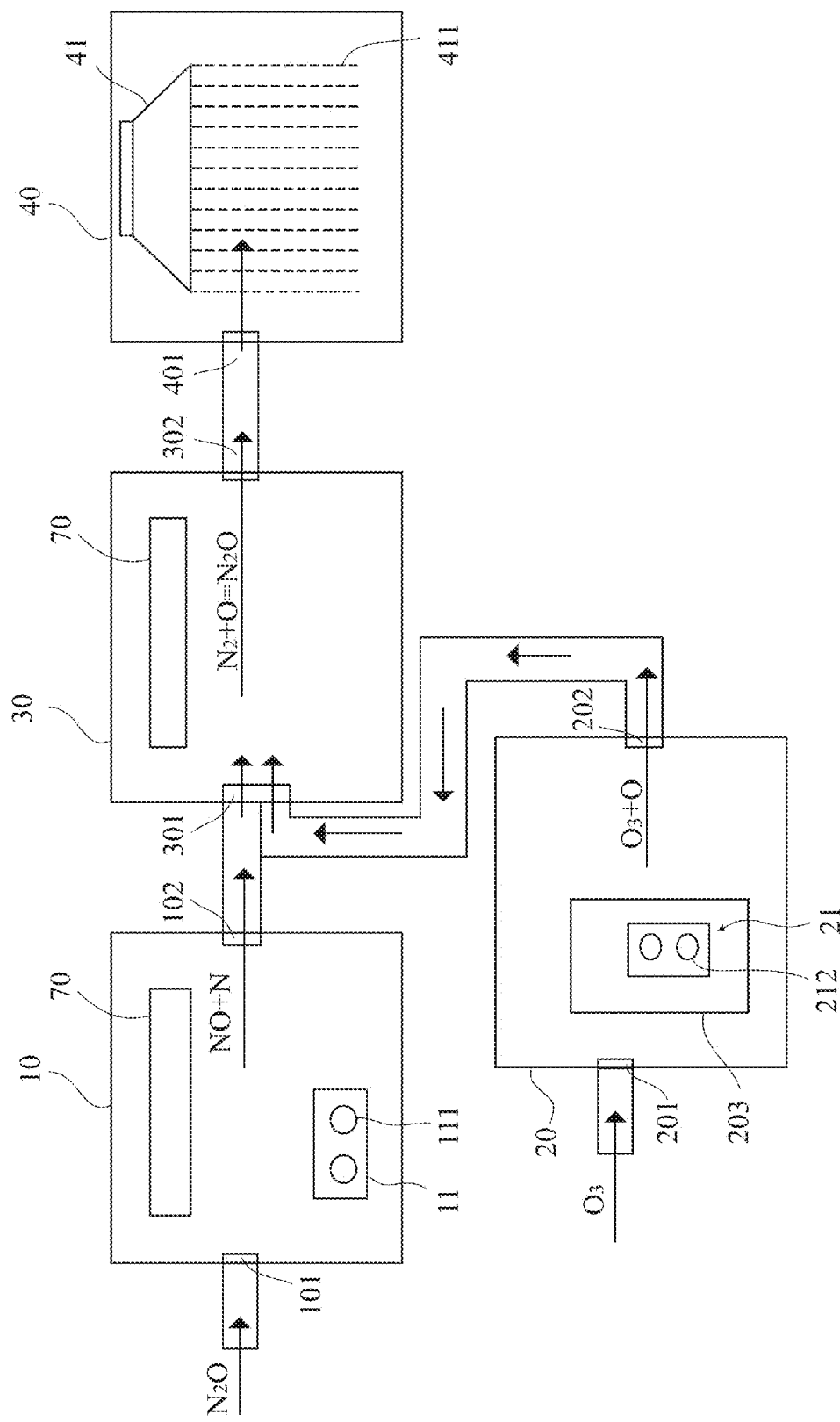

Referring to FIG. 8, in another embodiment, the second energy 21 comprises a second ultraviolet source 212 with a wavelength of 230-280 nm to allow ozone to be rapidly cracked into $O_2$ and O and promote the oxygen atom to an excited state.

Afterward, the excited-state ionized gas of the first chamber 10 and the excited-state oxygen atom of the second chamber 20 are delivered to the third chamber 30 to undergo a reaction so that the resultant gas in the third chamber 30 comprises nitrogen dioxide ($NO_2$), wherein their reaction equations (3)~(5) are as follows:

$$O(^1D) + N_2O \rightarrow 2NO \qquad (3)$$

$$O(^1D) + NO \rightarrow NO_2 \qquad (4)$$

Then, the resultant gas in the third chamber 30 is delivered to the fourth chamber 40. The fourth chamber 40 has the scrubbing system 41. The scrubbing system 41 contains the solvent 411 for dissolving nitrogen dioxide ($NO_2$). Preferably, the solvent 411 comprises a water molecule ($H_2O$) so that nitrogen dioxide ($NO_2$) is dissolved to produce $HNO_3$. Appropriate constituents of the solvent 411 are selected according to the constituents of the gas in the third chamber. In this embodiment, the solvent 411 for use in the scrubbing system 41 is water, and its reaction equation (6) is as follows:

$$NO_2 + H_2O \rightarrow 2HNO_3 \qquad (6)$$

The present invention further provides the turbulence system 70 disposed in the first chamber 10, the second chamber 20 or the third chamber 30 to enable the gas in each chamber to generate a turbulent flow conducive to thorough reactions. Take the first chamber 10 as an example, if the first energy 11 thereof originates from the first ultraviolet source 111, the number of ultraviolet lamps provided must be increased to ensure uniform irradiation of the gas by ultraviolet, albeit to the detriment of cost-effectiveness because ultraviolet has a penetration depth of 0.1-3 cm. Therefore, in the presence of a specific number of the first ultraviolet sources 111, the turbulence system 70 increases the gas current inside the first chamber 10 to not only enhance the efficiency of treating the first ultraviolet sources 111 but also increase the production of the excited-state ionized gas at the same time in the same space.

Take the third chamber 30 as an example, when gases of the first chamber 10 and the second chamber 20 are supplemented by the excited-state ionized gas and the excited-state oxygen atom and delivered to the third chamber 30, respectively. The turbulence system 70 disposed in the third chamber 30 enhances the efficiency of collision between the excited-state ionized gas and the excited-state oxygen atom in the third chamber 30 and thereby increases the yield of nitrogen dioxide ($NO_2$). Therefore, preferably, the turbulence system 70 has a turbulent flow for generating Reynolds number of at least 3000. To this end, it is feasible to employ several techniques, as appropriate, including arranging the fins 701 of FIG. 2 or the ultraviolet sources 702 of FIG. 3 in a matrix or alternately, or providing the nozzles 703 of FIG. 4, to bring a turbulence effect, so as to enhance the efficiency of collision between the excited-state ionized gas and the excited-state oxygen atom and increase the yield of nitrogen dioxide ($NO_2$).

Figure 9:
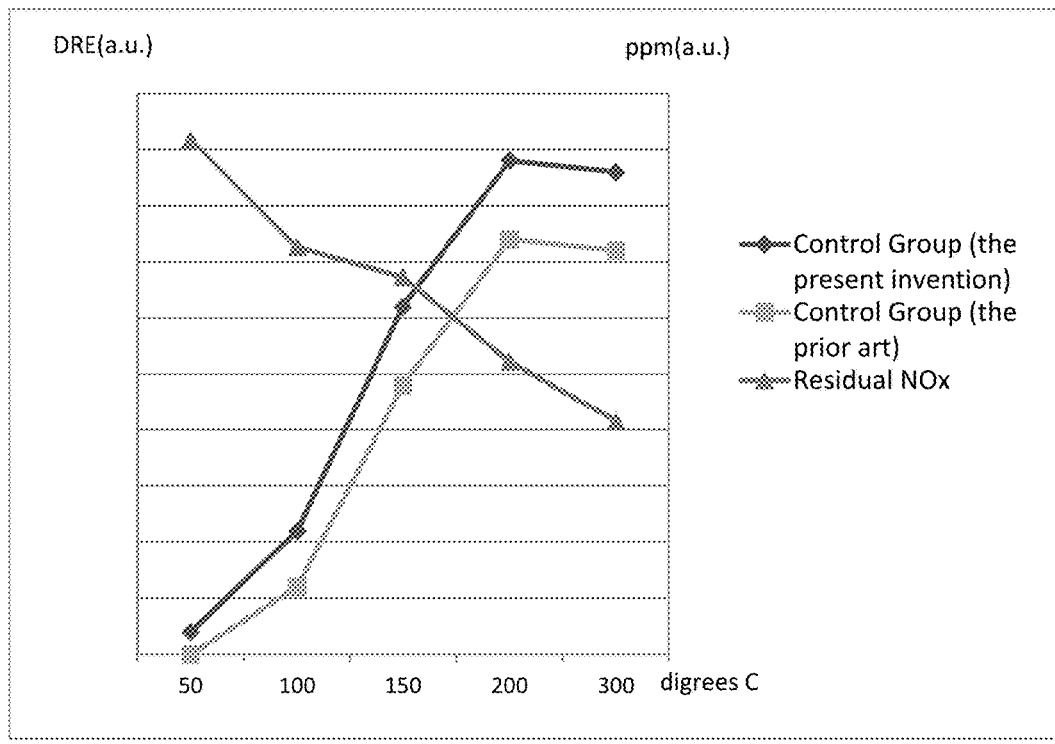
FIG. 9 is experiments are conducted with the gas treatment device of the present invention

Referring to FIG. 9, experiments are conducted with the gas treatment device 100 of the present invention and by the method of treating a gas according to the present invention under experimental conditions described below.

Control Group (the present invention): a gas comprising nitrous oxide ($N_2O$) and intended to be treated is delivered to the first chamber 10; the first energy supply system 103 in the first chamber 10 comprises the first ultraviolet source 1031 with a wavelength of 160-210 nm; ozone is delivered to the second chamber 20; the second energy supply system 203 heats up the second chamber 20 to 50° C. through 300° C. with a heating device so as to perform tests in different stages, detecting variations of gas concentration (ppm) of nitrous oxide ($N_2O$) in the first chamber 10 and the fourth chamber 40 and the destruction and removal efficiency (DRE); and the resultant data is marked with ♦ and ▲.

Control Group (the prior art): the gas is delivered to the third chamber 30 without being pretreated in the first chamber 10 and the second chamber 20; the third chamber 30 is heated up to 50° C. through 300° C. so as to perform tests in different stages, detecting variations of gas concentration (ppm) of nitrous oxide ($N_2O$) in the first chamber 10 and the fourth chamber 40; the resultant data is marked with ■; and the result shows that, unlike the control group, the experimental group enhances the destruction and removal efficiency (DRE) (6%-8%), indicating that the present invention has novelty and nonobviousness.

Figure 10:
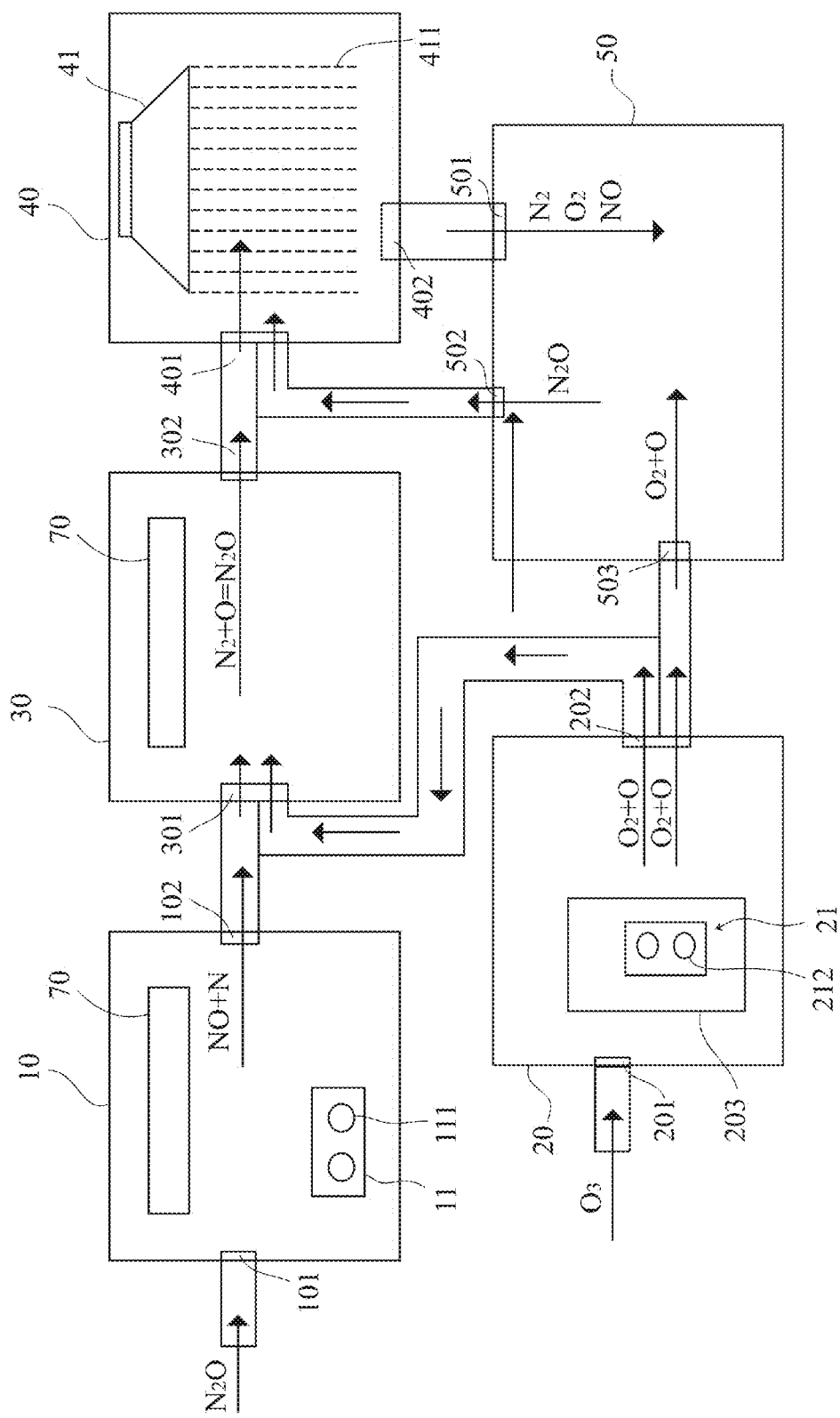

Referring to FIG. 10, according to the present invention, the method of treating a gas further requires the fifth chamber 50 for treating again the NO gas which originates from the fourth chamber 40 and does not dissolve in water. The fourth outlet 402 of the fourth chamber 40 is in communication with the fifth inlet 501 of the fifth chamber 50. Any gas which has not yet been fully treated in the fourth chamber 40 is delivered to the fifth chamber 50. An excited-state oxygen atom is delivered to the fifth chamber 50 through the fifth gas inlet 503 to undergo a reaction such that the fifth chamber 50 contains a gas comprising a nitrogen dioxide ($NO_2$), as expressed by reaction equation (7).

$$O(^1D)+NO \rightarrow NO_2 \quad (7)$$

Afterward, the gas comprising nitrogen dioxide ($NO_2$) and contained in the fifth chamber 50 is delivered to the fourth chamber 40 through the fifth outlet 502, so as to be treated by the scrubbing system 41 again.

The excited-state oxygen atom admitted through the fifth gas inlet 503 originates from the excited-state oxygen atom produced inside the second chamber 20. The second outlet 202 of the second chamber 20 is in communication with the fifth gas inlet 503 of the fifth chamber 50. Hence, after the ozone in the second chamber 20 has been cracked to produce an excited-state oxygen atom, the excited-state oxygen atom is delivered to the third chamber 30 and the fifth chamber 50 through the second outlet 202, so as to be made good use of and enhance utilization efficiency.

Although the present invention is disclosed above by preferred embodiments, the preferred embodiments are not restrictive of the claims of the present invention. Any persons skilled in the art can make equivalent changes or modifications to the preferred embodiments without departing from the spirit of the present invention. Accordingly, the legal protection for the present invention should be defined by the appended claims.

What is claimed is:

1. A method of treating a gas, the gas comprising a nitrous oxide ($N_2O$), the method comprising the steps of:
delivering the gas to a first chamber 10, followed by supplying a first energy 11 to the first chamber 10, so as for the gas to form an excited-state ionized gas, wherein the ionized gas comprises a nitric oxide (NO) and a nitrogen atom (N);
supplying an ozone ($O_3$) to a second chamber 20, wherein the second chamber 20 has a second energy whereby the ozone forms an excited-state oxygen atom (O);
delivering the excited-state ionized gas of the first chamber 10 and the excited-state oxygen atom of the second chamber to a third chamber 30 to allow a reaction to occur between the excited-state ionized gas and the excited-state oxygen atom such that the gas in the third chamber 30 comprises a nitrogen dioxide ($NO_2$); and
delivering the gas of the third chamber 30 to a fourth chamber 40, wherein the fourth chamber 40 has a scrubbing system 41, and the scrubbing system 41 contains a solvent 411 for dissolving nitrogen dioxide ($NO_2$).

2. The method of claim 1, wherein the first energy 11 and the second energy 21 are each one of a heat energy, a light energy and a combination thereof.

3. The method of claim 2, wherein the first energy 11 comprises the first ultraviolet sources 111 with a wavelength of 160-210 nm.

4. The method of claim 2, wherein the second energy 21 is supplied by a heat-generating device 211.

5. The method of claim 2, wherein the second energy 21 comprises a second ultraviolet source 212 with a wavelength of 230-280 nm.

6. The method of claim 1, wherein the solvent 411 of the scrubbing system 41 comprises a water molecule ($H_2O$).

7. The method of claim 1, wherein one of the first chamber 10, the second chamber 20 and the third chamber 30 further has a turbulence system 70.

8. The method of claim 7, wherein the turbulence system 70 has a turbulent flow for generating Reynolds number of at least 3000.

9. The method of claim 7, wherein the turbulence system 70 comprises a plurality of fins 701.

10. The method of claim 7, wherein the turbulence system 70 comprises a plurality of ultraviolet sources 702 arranged in a matrix or alternately and disposed in gas channels of one of the first chamber 10 and the third chamber 30 such that the gas flows and collides with the ultraviolet sources 702 to bring a turbulence effect.

11. The method of claim 7, wherein the turbulence system 70 is a nozzle 703.

12. The method of claim 1, wherein the fourth chamber 40 connects with a fifth chamber 50, allowing an excited-state oxygen atom to be delivered to the fifth chamber 50 to undergo a reaction therein such that the fifth chamber 50 contains the gas comprising a nitrogen dioxide ($NO_2$), wherein the gas contained in the fifth chamber 50 and comprising the nitrogen dioxide ($NO_2$) is delivered to the fourth chamber 40.

13. The method of claim 12, wherein the excited-state oxygen atom is produced in the second chamber 20.

14. A gas treatment device 100, for treating a gas comprising a nitrous oxide ($N_2O$), the gas treatment device 100 comprising:

a first chamber 10 comprising a first inlet 101, a first outlet 102 and a first energy supply system 103, allowing the gas to enter the first chamber 10 through the first inlet 101;

a second chamber 20 comprising a second outlet 202 and a second energy supply system 203;

a third chamber 30 comprising a third inlet 301 in communication with the first outlet 102 and the second outlet 202; and a fourth chamber 40 comprising a fourth inlet 401 and a scrubbing system 41 containing a solvent 411 comprising water molecules ($H_2O$), wherein the third outlet 302 of the third chamber 30 is in communication with the fourth inlet 401 of the fourth chamber 40;

wherein the first energy supply system 103 and the second energy supply system 203 comprise one of a heat energy, a light energy and a combination thereof.

15. The gas treatment device of claim 14, wherein the first energy supply system 103 comprises a first ultraviolet source 1031 with a wavelength of 160-210 nm.

16. The gas treatment device of claim 15, wherein the first energy supply system 103 has a first hermetically sealed container 1032, and the first ultraviolet source 1031 are disposed in the first hermetically sealed container 1032.

17. The gas treatment device of claim 14, wherein the second energy supply system 203 comprises a heat-generating device 211 for generating a temperature of 100-300° C.

18. The gas treatment device of claim 17, wherein a wall of the first hermetically sealed container 1032 is made of one of sapphire and a material penetrable by the ultraviolet sources with a wavelength of 160-210 nm.

19. The gas treatment device of claim 14, wherein the second energy supply system 203 comprises a second ultraviolet source 2031 with a wavelength of 230-280 nm.

20. The gas treatment device of claim 19, wherein the second energy supply system 203 has a second hermetically sealed container 2033, and the second ultraviolet sources 2032 are disposed in the second hermetically sealed container 2033.

21. The gas treatment device of claim 20, wherein a wall of the second hermetically sealed container 2033 is made of one of sapphire and a material penetrable by the ultraviolet sources with a wavelength of 230-280 nm.

22. The gas treatment device of claim 14, wherein one of the first chamber 10 and the third chamber 30 further has a turbulence system 70.

23. The gas treatment device of claim 22, wherein the turbulence system 70 has a turbulent flow for generating Reynolds number of at least 3000.

24. The gas treatment device of claim 22, wherein the turbulence system 70 comprises a plurality of fins 701.

25. The gas treatment device of claim 22, wherein the turbulence system 70 comprises a plurality of ultraviolet sources 702 arranged in a matrix or alternately and disposed in gas channels of one of the first chamber 10 and the third chamber 30 such that the gas flows and collides with the ultraviolet sources 702 to bring a turbulence effect.

26. The gas treatment device of claim 22, wherein the turbulence system 70 is a nozzle 703.

27. The gas treatment device of claim 14, wherein the fourth chamber 40 has a fourth outlet 402 in communication with a fifth inlet 501 of a fifth chamber 50, and the fifth chamber 50 has a fifth gas inlet 503.

28. The gas treatment device of claim 27, wherein the fifth gas inlet 503 is in communication with the second outlet 202 of the second chamber 20.

29. The gas treatment device of claim 27, wherein the fifth chamber 50 further has a fifth outlet 502 in communication with the fourth inlet 401 of the fourth chamber 40.

* * * * *